US006554703B1

(12) United States Patent
Bussick et al.

(10) Patent No.: US 6,554,703 B1
(45) Date of Patent: Apr. 29, 2003

(54) GAMING DEVICE HAVING MULTIPLE AUDIO, VIDEO OR AUDIO-VIDEO EXHIBITIONS ASSOCIATED WITH RELATED SYMBOLS

(75) Inventors: William J. Bussick, Sparks, NV (US); Lance R. Peterson, Reno, NV (US); Anthony J. Baerlocher, Reno, NV (US); Garrett M. Olson, Reno, NV (US); James A. Vasquez, Carson City, NV (US); Joseph E. Kaminkow, Reno, NV (US); Aaron T. Jones, Reno, NV (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 09/689,529

(22) Filed: Oct. 12, 2000

(51) Int. Cl.[7] ................ A63F 13/00
(52) U.S. Cl. ................ 463/20; 273/143 R
(58) Field of Search ................ 463/16–20; 273/143 R, 273/138.1

(56) References Cited

U.S. PATENT DOCUMENTS

| | | | | |
|---|---|---|---|---|
| 4,695,053 A | | 9/1987 | Vazquez, Jr. et al. | 273/143 R |
| 5,342,047 A | | 8/1994 | Heidel et al. | 273/85 CP |
| 5,393,061 A | * | 2/1995 | Manship et al. | 463/20 |
| 5,766,074 A | | 6/1998 | Cannon et al. | 463/16 |
| 6,015,346 A | | 1/2000 | Bennett | 463/20 |
| 6,056,642 A | | 5/2000 | Bennett | 463/20 |
| 6,071,192 A | | 6/2000 | Weiss | 463/31 |
| 6,089,977 A | * | 7/2000 | Bennett | 463/20 |
| 6,102,798 A | | 8/2000 | Bennett | 463/16 |
| 6,126,165 A | | 10/2000 | Sakamoto | 273/143 R |
| 6,135,884 A | * | 10/2000 | Hedrick et al. | 463/20 |
| 6,159,095 A | | 12/2000 | Frohm et al. | 463/19 |
| 6,159,097 A | * | 12/2000 | Gura | 463/20 |
| 6,190,255 B1 | * | 2/2001 | Thomas et al. | 463/20 |
| 6,231,442 B1 | * | 5/2001 | Mayeroff | 463/20 |
| 6,231,445 B1 | * | 5/2001 | Acres | 463/42 |
| 6,251,013 B1 | * | 6/2001 | Bennett | 463/13 |
| 6,261,177 B1 | * | 7/2001 | Bennett | 463/16 |
| 6,270,411 B1 | * | 8/2001 | Gura et al. | 463/20 |
| 6,287,194 B1 | * | 9/2001 | Okada et al. | 463/16 |
| 6,302,790 B1 | * | 10/2001 | Brossard | 463/20 |
| 6,331,976 B1 | | 11/2001 | Yoseloff et al. | 273/138.2 |

OTHER PUBLICATIONS

Cash Chameleon Article written by Aristocrat Technologies, published Apr., 2001.
Introducing The Hottest Video Games on the Nile written by Aristocrat Technologies, published Oct., 2000.
Little Green Men Brochure and Article published by IGT in 2000.
Wheel of Fortune Brochure published by IGT in 1999.
Winning Bid Brochure published by WMS Gaming, Inc.
Reel em In—Cast for Cash Brochure & Website published by WMS Gaming, Inc. in 2001.
Jackpot Party Brochure and Article published by WMS Gaming, Inc. in 1998.
Description of Gaming Machine with Animating Symbols.

* cited by examiner

*Primary Examiner*—Valencia Martin-Wallace
*Assistant Examiner*—Scott E. Jones
(74) *Attorney, Agent, or Firm*—Bell, Boyd & Lloyd LLC

(57) ABSTRACT

The present invention is a gaming device that provides a gaming device that displays a plurality of related symbols, wherein each symbol has a different exhibition associated with it. The gaming device includes a display adapted to display the symbols and the exhibitions, whereby when a symbol is selected, the display provides the associated exhibition. In one preferred embodiment, the gaming device includes an exhibition library that stores a plurality of exhibitions. Each time a symbol is selected, the gaming device selects an exhibition from the exhibition library, associates it with that symbol, and displays it.

36 Claims, 6 Drawing Sheets

| | | | | |
|---|---|---|---|---|
| A | E | G | C | D |
| H | B | C | F | H |
| C | F | G | B | A |
| D | A | H | D | G |
| B | E | F | E | H |

FIG. 4

GAMING DEVICE HAVING MULTIPLE AUDIO, VIDEO OR AUDIO-VIDEO EXHIBITIONS ASSOCIATED WITH RELATED SYMBOLS

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device having multiple audio, video and audio-video exhibitions associated with related symbols to entertain players.

BACKGROUND OF THE INVENTION

Gaming devices currently exist with bonus rounds in which a player has one or more opportunities to obtain bonus awards by selecting one or more masked awards from a group or plurality of masked awards displayed to the player. When the player chooses a masked award from the group, the game removes the mask and either awards the player with a bonus value or terminates the bonus round with a bonus terminator. The outcome depends upon whether the player selects an award or a terminator.

In the above game, the controller of the gaming device randomly places a predetermined number of masked awards and terminators in the group at the beginning of the bonus round and maintains the positioning until the bonus round terminates. When the player selects a masked award, the player receives the value of the award, and the game typically displays a message that the player may continue and enables the player to select another masked award. The player then selects another masked award, and the process continues until the player selects a masked terminator. European Patent Application No. EP 0 945 837 A2 filed on Mar. 18, 1999 and assigned on its face to WMS Gaming, Inc. discloses a bonus round of this type.

Various other known gaming devices provide bonus games where the awards are masked. In such games, the masked awards are generally represented by a symbol or image displayed to the player (often on a touch screen). When the player touches or selects a symbol, the game displays an audio, video or audio-video exhibition to entertain the player. Heretofore such, audio, video and audio video exhibitions have been identical for identical or related symbols displayed by the gaming device. The players can become bored based on this repetitive play of one or more audio, video or audio-video exhibitions.

SUMMARY OF THE INVENTION

The gaming device of the present invention includes a bonus round that provides multiple different audio, video or audio-video exhibitions associated with identical or related symbols provided by the gaming device. More particularly, the gaming device of the present invention provides a plurality of symbols or images in conjunction with a primary game (such as a slot machine game) or a secondary game (such as a bonus game). Several of these symbols are identical or related in some way (i.e., they are different images of the same character or object). Such identical or related symbols are hereinafter referred to as related symbols. The present invention provides each related symbol with different audio, video or audio-video exhibitions to entertain the player. The exhibitions associated with each related symbol may be predetermined or randomly determined from a group of exhibitions.

In the preferred embodiment, the gaming device randomly associates the exhibitions with the symbols. In one embodiment, a plurality of exhibitions are stored on the gaming device creating an exhibition library. Each time the player makes a selection, the controller randomly selects one of the exhibitions from the library and associates it with that selection (i.e., provides the exhibition to the player in an audio, video or audio-video format).

It is therefore an object of the present invention to provide a gaming device, wherein the game includes multiple audio, video or audio-video exhibitions associated with identical symbols.

Other objects, features and advantages of the invention will be apparent from the following detailed disclosure, taken in conjunction with the accompanying sheets of drawings, wherein like numerals refer to like parts, elements, components, steps and processes.

BRIEF DESCRIPTION OF THE DRAWINGS

FIG. 4 is a front elevational view of a plurality of symbols of one embodiment of the present invention.

DETAILED DESCRIPTION OF THE INVENTION

Gaming Device and Electronics

Figure 1A:
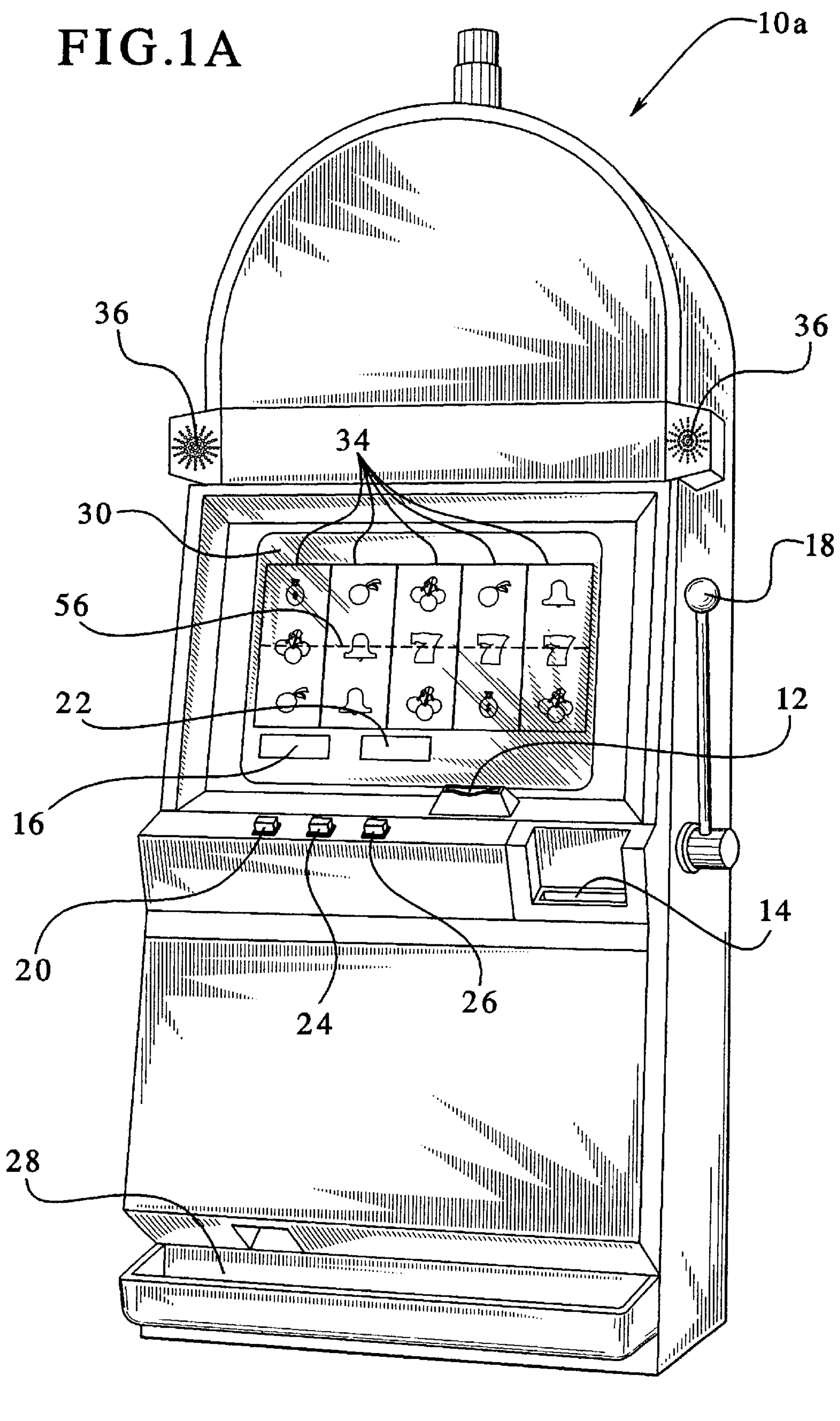
FIGS. 1A and 1B are front elevational views of a general embodiment of the gaming device of the present invention.
Figure 1B:
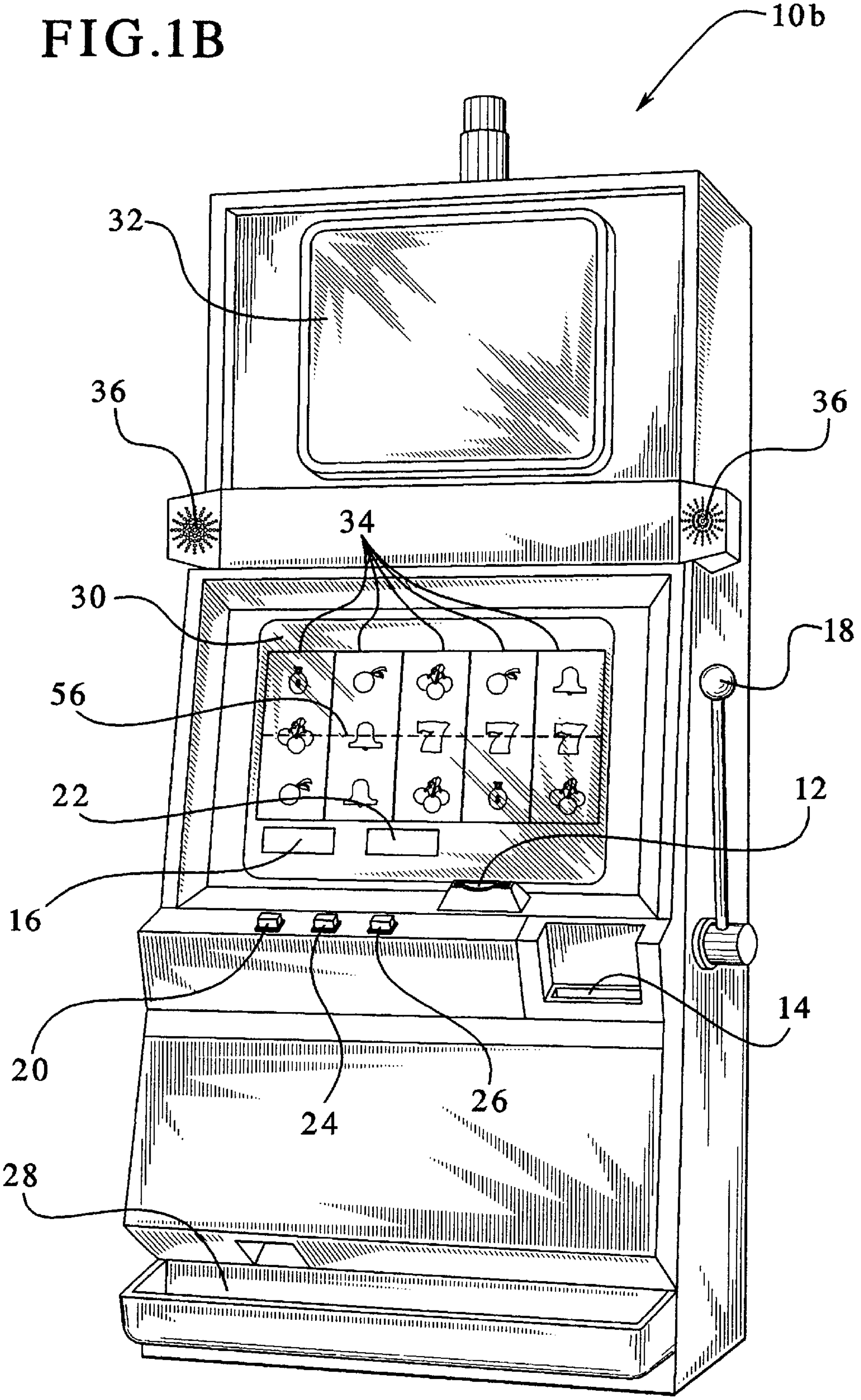

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. Gaming device 10 is preferably a slot machine having the controls, displays and features of a conventional slot machine. It is constructed so that a player can operate it while standing or sitting, and gaming device 10 is preferably mounted on a console. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can incorporate any primary game such as slot, poker or keno, any of their bonus triggering events and any of their bonus round games. The symbols and indicia used on and in gaming device 10 may be in mechanical, electrical or video form, although they are preferably in video form.

As illustrated in FIGS. 1A and 1B, gaming device 10 includes a coin slot 12 and bill acceptor 14 where the player inserts money, coins or tokens. The player can place coins in the coin slot 12 or paper money or ticket voucher in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

At any time during the game, a player may "cash out" and thereby receive a number of coins corresponding to the number of remaining credits by pushing a cash out button 26. When the player "cashes out," the player receives the coins in a coin payout tray 28. The gaming device 10 may employ other payout mechanisms such as credit slips redeemable by a cashier or electronically recordable cards which keep track of the player's credits.

Gaming device 10 also includes one or more display devices. The embodiment shown in FIG. 1A includes a central display device 30, and the alternative embodiment shown in FIG. 1B includes a central display device 30 as well as an upper display device 32. In the slot machine embodiment, gaming device 10 displays a plurality of reels 34, preferably three to five reels 34 in mechanical or video form at one or more of the display devices. However, it should be appreciated that the display devices can display any visual representation or display, including but not limited to movement of physical objects such as mechanical reels and wheels, dynamic lighting and video images. A display device can be any viewing surface such as glass, a video monitor or screen, a liquid crystal display or any other display mechanism. If the reels 34 are in video form, the display device for the video reels 34 is preferably a video monitor.

Each reel 34 displays a plurality of indicia such as bells, hearts, fruits, numbers, letters, bars or other images which preferably correspond to a theme associated with the gaming device 10. Furthermore, gaming device 10 preferably includes speakers 36 for providing sounds or playing music.

Figure 2:
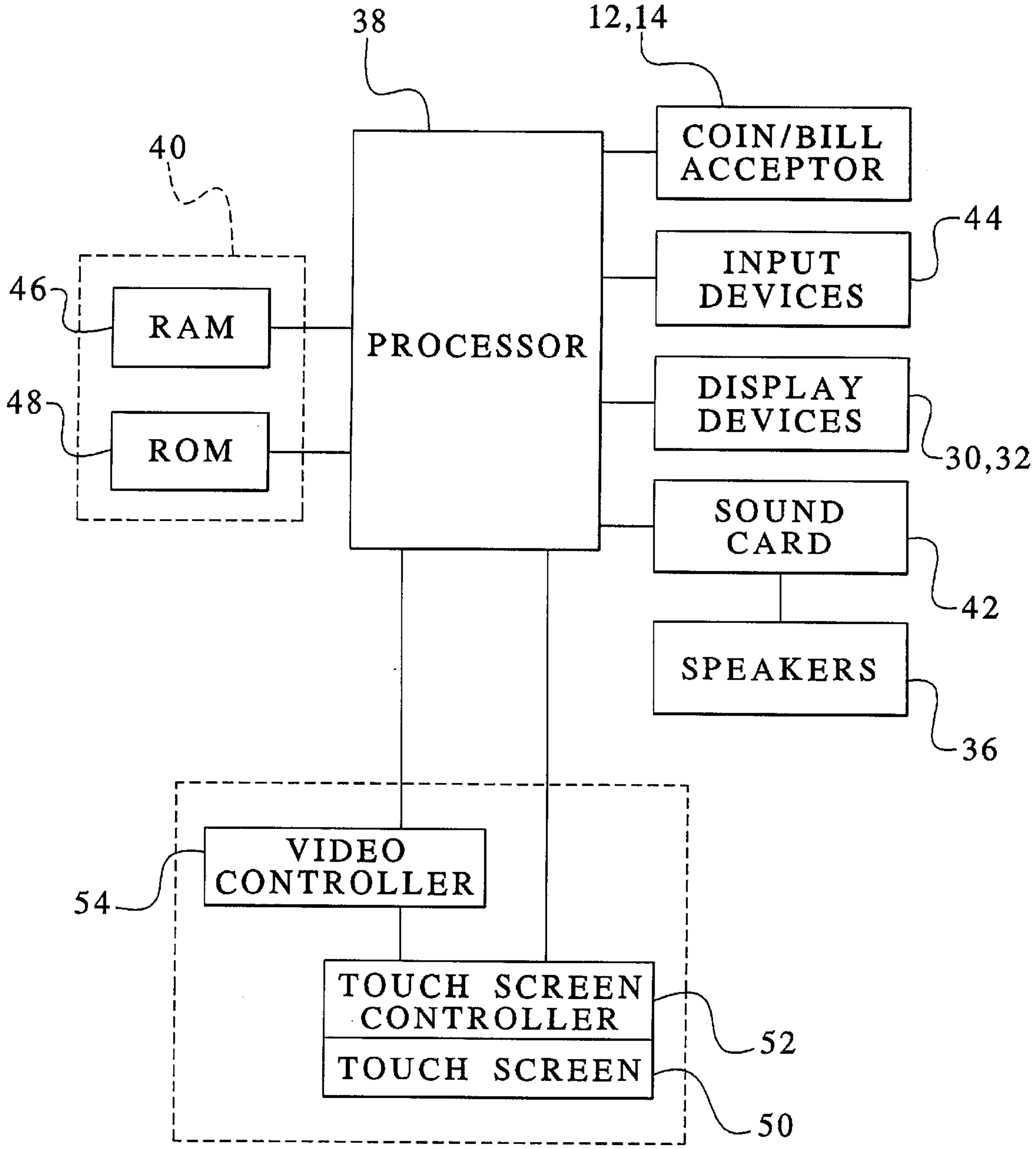
FIG. 2 is a schematic block diagram of the electronic configuration of one embodiment of the gaming device of the present invention.

As illustrated in FIG. 2, the general electronic configuration of gaming device 10 preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. For the present invention, it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places (such as on the symbols as described below). As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 is generally referred to herein as the "computer" or "controller."

With reference to FIGS. 1A, 1B and 2, to operate the gaming device 10 in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, the gaming device 10 may also provide players the opportunity to win credits in a bonus round. This type of gaming device 10 will include a program which will automatically begin a bonus round when the player has achieved a qualifying condition in the game. This qualifying condition can be a particular arrangement of indicia on a display device. The gaming device 10 preferably uses a video-based central display device 30 to enable the player to play the bonus round. Preferably, the qualifying condition is a predetermined combination of indicia appearing on a plurality of reels 34. As illustrated in the five reel slot game shown in FIGS. 1A and 1B, the qualifying condition could be the number seven appearing on three adjacent reels 34 along a payline 56. It should be appreciated that the gaming machines can include one or more paylines, such as payline 56, wherein the paylines can be horizontal, diagonal or any combination thereof.

Multiple Exhibitions

The present invention may be employed in a primary game or a secondary game such as a bonus round. The present invention displays a plurality of symbols. The symbols are preferably images consisting of varying graphics and having various sizes, shapes and colors. The plurality of symbols are displayed on a video or virtual display device as described above. In one preferred embodiment, a plurality of symbols are provided on the video reels or in a grid-like arrangement as illustrated in FIG. 4. The symbols can be aligned or spaced apart in an orderly or disorderly fashion.

Preferably, certain of the symbols have related characteristics including being identical symbols. For example, certain related symbols could be red-colored symbols and other related symbols could be blue-colored symbols. Symbols could, for instance, be letters of the alphabet (i.e., a pair of A's, a pair of D's, etc.). In one preferred embodiment, the related symbols are identical images of characters. Alternatively, the symbols could be related in that the symbols are different images of the same character.

It should also be appreciated that the related symbols could have no similarities but nonetheless belong to the same predetermined set. These symbols can be logically related, for example: a horse and buggy, drum sticks and a drum, or a rabbit and carrot. It should be appreciated that any number of related symbols may be employed in the present invention.

Figure 3:
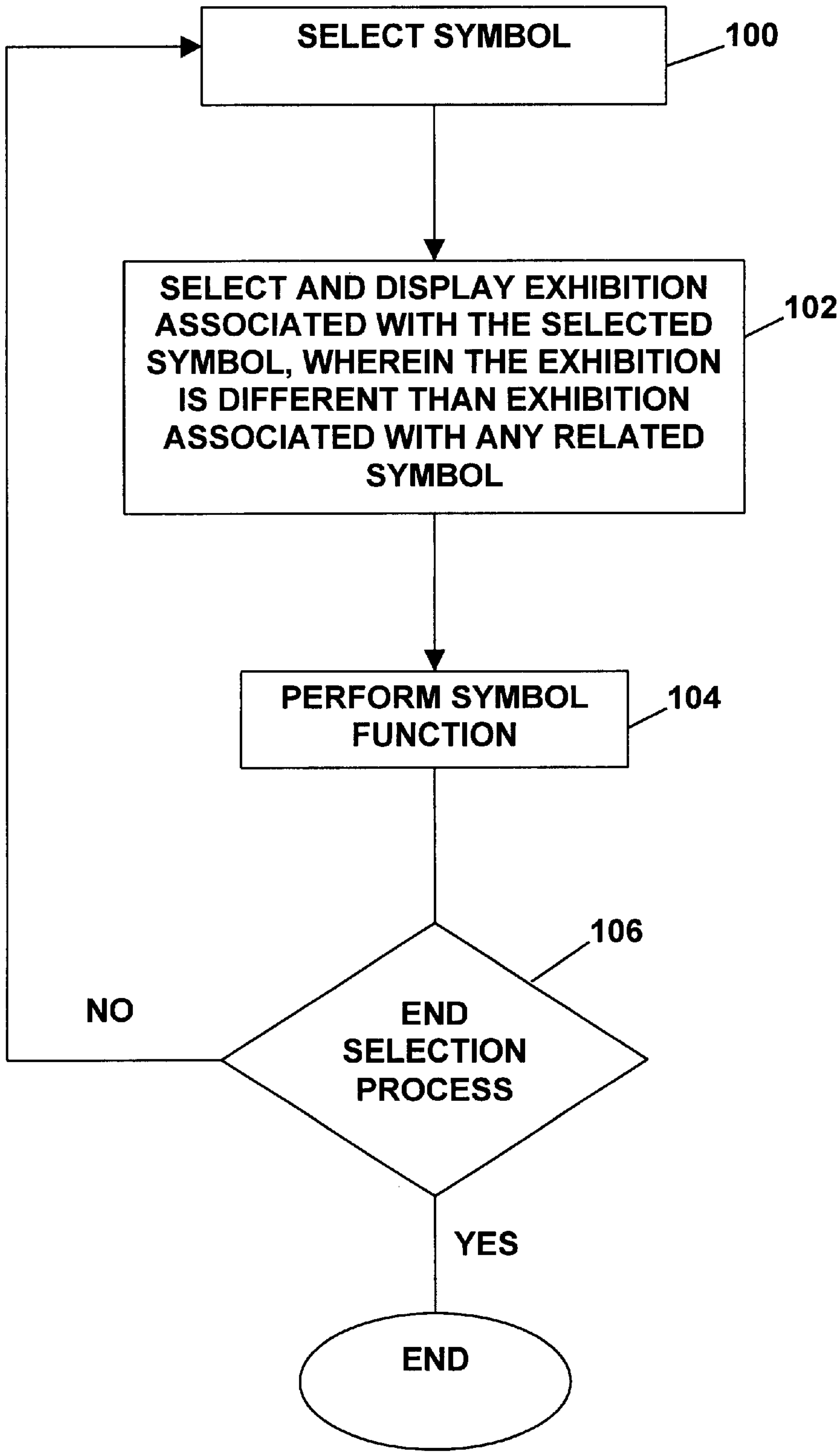
FIG. 3 is flow diagram of one embodiment of the gaming scheme of the present invention.

When a symbol is selected, the gaming device displays an exhibition associated with that symbol in audio, video or audio-video form. When a related symbol is selected, the gaming device preferably displays a different exhibition. In the preferred embodiment of the present invention, the gaming device displays a different exhibition for related symbols (including each identical symbol selected). Referring now to FIG. 3, the symbol is selected as indicated by block 100, the game displays the exhibition associated with the selected symbol as indicated by block 102, wherein the exhibition is different than the exhibition associated with any related symbol, the game performs the symbol function as indicated by block 104 and repeats the process if the selection process does not end as indicated by diamond 106.

In one embodiment, the symbols represent different characters from television programs or movies, while the exhibitions represent audio, video or audio-video sounds or images associated with those characters from the television programs or the movies.

In the preferred embodiment, the gaming device 10 randomly associates the different exhibitions with the related symbols. In one embodiment, a plurality of exhibitions are stored in the memory device 40 of the gaming device 10 creating an exhibition library. It should be appreciated that in one preferred embodiment, the number of exhibitions stored in the library at least equal and preferably exceed, the number of symbols simultaneously provided by the game. Each time the player selects a symbol, the controller randomly selects one of the exhibitions from the library and associates it with that symbol. This type of event can occur without player input. The gaming device can determine if an exhibition is to be played and automatically select an exhibition to show to the player, for instance to celebrate, highlight or describe a win in a base game or bonus round.

In one preferred embodiment of the present invention, after an exhibition is displayed it is eliminated from the available exhibitions in the library until the next implementation (such as a new primary game or bonus round). That eliminated exhibition is not used (i.e., displayed) for the remainder of the implementation. In another embodiment, the exhibition is returned to library so that it has a chance of being selected again in the bonus round. In yet another embodiment of the present invention, one exhibition is associated with each symbol. That is, at the initiation of the bonus round, the controller selects one exhibition from the library and associates it with one symbol, so that each particular symbol in an implementation has its own associated exhibition, different from all the other related symbols. Thereafter, any time that symbol is selected only that exhibition is provided.

Preferably the game device 10 rearranges the symbols and exhibitions associated with the symbols each time a new implementation begins. The rearrangement prevents the symbols from being located in the same place, for instance on the grid 100, from one implementation to the next implementation.

The present invention offer players additional entertainment because the player does not know what exhibition the player will receive when the player selects related symbols. It should be appreciated that different exhibitions could include some similar or the same features, frames or images. For instance, two exhibitions associated with an identical symbol could include identical first frames or identical last frames. The first and last frames of an exhibition could also be identical to create a looping effect. The last frame of one exhibition could also be the first frame of another exhibition. It should be appreciated that the occurrence of an event such as a win or loss could determine which exhibition is provided to the player.

Figure 5:
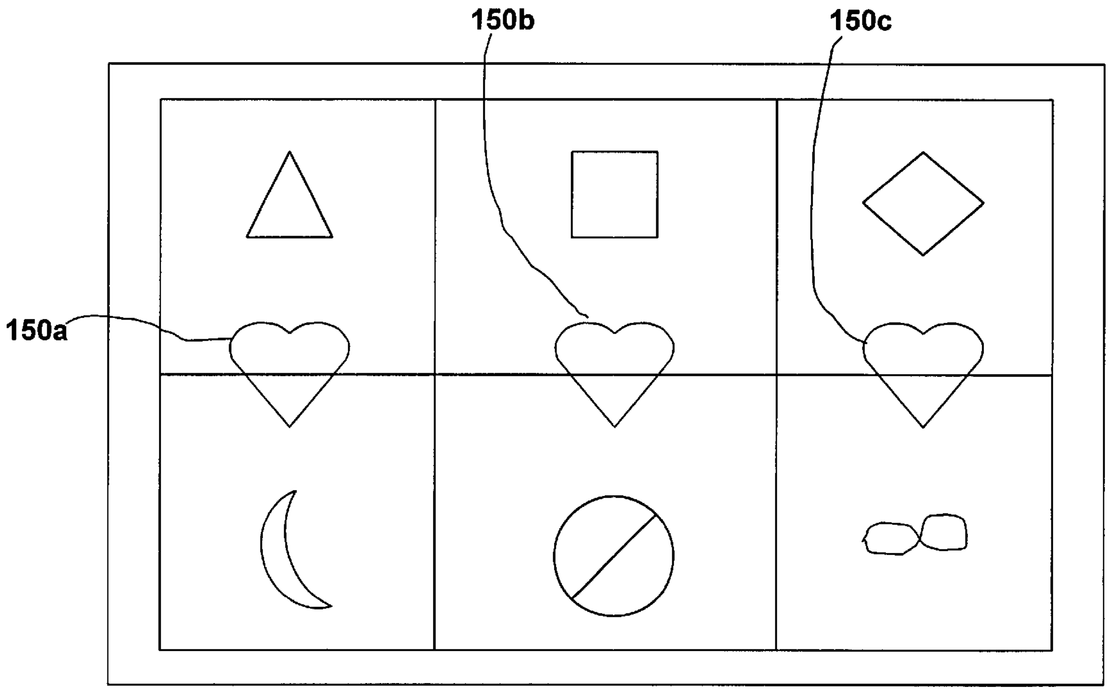
FIG. 5 is a front elevational view of a standard reel configuration with a winning combination on the payline.

A further alternative embodiment of the present invention is illustrated in FIG. 5 which displays a conventional video reel. In this embodiment, an exhibition from the exhibition library is associated with two or more symbols on a payline when the symbols result in or cause a win or other event for the player. In different games, different exhibitions are associated with such symbols. For example, in FIG. 5, the same exhibition would be associated with each of the heart symbols 150*a*, 150*b* and 150*c*, but in a subsequent game, a different exhibition would be associated with the heart symbols. It should also be appreciated that the exhibition could be selected based on predetermined criteria such as when a symbol is used or what other symbols are combined with said symbol.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is hereby claimed as follows:

1. A gaming device comprising:

a plurality of symbols including a plurality of identical first symbols;

a plurality of exhibitions associated with said symbols including a different exhibition associated with each identical first symbol, each exhibition including a plurality of images and said different exhibitions each including a plurality of different images;

an input device which enables a player to select at least one of the symbols;

a display device which displays the symbols and the exhibitions associated with the selected symbols; and a processor in communication with the input device and the display device, which causes the display device to display the exhibition associated with the selected symbol after the player selects said symbol.

2. The gaming device of claim 1, wherein the plurality of symbols include a plurality of identical second symbols, and the plurality of exhibitions associated with said symbols include a different exhibition associated with each identical second symbol.

3. The gaming device of claim 1, wherein the different exhibitions include an identical first image.

4. The gaming device of claim 1, wherein the different exhibitions include an identical last image.

5. The gaming device of claim 1, wherein the different exhibitions include an identical first image and an identical last image.

6. The gaming device of claim 1, wherein the processor randomly determines which different exhibitions are associated with the identical first symbols.

7. The gaming device of claim 1, which includes an exhibition library accessible by the processor which stores the exhibitions including the different exhibitions, wherein the processor randomly determines which different exhibitions are associated with the identical first symbols when the identical first symbols are selected.

8. The gaming device of claim 1, wherein the first symbol is the first image of at least one of the exhibitions associated with one of the first symbols.

9. A gaming device comprising:

a plurality of identical first symbols and a plurality of identical second symbols;

a plurality of different first exhibitions associated with said identical first symbols and a plurality of different second exhibitions associated with said identical second symbols, each different exhibition including a plurality of different images;

an input device which enables a player to select at least one of the first and second symbols;

a display device which displays the symbols and the exhibitions associated with the selected symbols; and a processor in communication with the input device and the display device, which causes the display device to display the exhibition associated with the selected symbol after the player selects said symbol.

10. The gaming device of claim 9, wherein the different first exhibitions include an identical first image and the different second exhibitions include an identical first image.

11. The gaming device of claim 9, wherein the different first exhibitions include an identical last image and the different second exhibitions include an identical last image.

12. The gaming device of claim 9, wherein the different first exhibitions include an identical first and last image and the different second exhibitions include an identical first and last image.

13. The gaming device of claim 9, wherein the processor randomly determines which different first exhibitions are associated with the identical first symbols and which different second exhibitions are associated with the identical second symbols.

14. The gaming device of claim 9, which includes an exhibition library accessible by the processor which stores the exhibitions including the different first exhibitions and different second exhibitions, wherein the processor randomly determines which different first exhibitions are associated with the identical first symbols when the identical first symbols are selected and randomly determines which different second exhibitions are associated with the identical second symbols when the identical second symbols are selected.

15. The gaming device of claim 9, wherein the first symbol is the first image of at least one of the exhibitions associated with one of the first symbols.

16. The gaming device of claim 9, wherein the second symbol is the first image of at least one of the exhibitions associated with one of the second symbols.

17. A gaming device comprising:

a plurality of symbols including a plurality of related symbols;

a different exhibition associated with each of the related symbols, each different exhibition including a plurality of frames including an identical first frame;

an input device which enables a player to select at least one of the symbols;

a display device which displays the symbols and the exhibitions; and a processor in communication with the input device and the display device, which causes the display device to display the exhibition associated with the selected symbol after the player selects said symbol.

18. A gaming device comprising:

a plurality of symbols including a plurality of related symbols;

a different exhibition associated with each of the related symbols, each different exhibition including a plurality of frames including an identical first and last frame;

an input device which enables a player to select at least one of the symbols;

a display device which displays the symbols and the exhibitions; and a processor in communication with the input device and the display device, which causes the display device to display the exhibition associated with the selected symbol after the player selects said symbol.

19. A gaming device comprising:

a plurality of symbols including a plurality of related symbols;

a different exhibition associated with each of the related symbols, each different exhibition including a plurality of frames including an identical first frame and at least one different subsequent frame;

an input device which enables a player to select at least one of the symbols;

a display device which displays the symbols and the exhibitions; and a processor in communication with the input device and the display device, which causes the display device to display the exhibition associated with the selected symbol after the player selects said symbol.

20. A gaming device comprising;

a plurality of symbols including a plurality of first symbols including a characteristic of a motion picture;

a different portion of said motion picture associated with each first symbol;

an input device which enables a player to select at least one of the symbols;

a display device which displays the first symbols and the different portions of the motion picture; and a processor in communication with the input device and the display device, which causes the display device to display the different portion of said motion picture associated with each first symbol after the player selects said first symbol.

21. The gaming device of claim 20, wherein the motion picture includes a movie.

22. The gaming device of claim 20, wherein the motion picture includes a television program.

23. The gaming device of claim 20, wherein the characteristic of the motion picture is selected from the group consisting of theme, plot, title, character, and scene.

24. A gaming device comprising:

a plurality of different images of one character, each image having a different characteristic;

a plurality of exhibitions of said character, a different exhibition associated with each image of said character, each said exhibition including a plurality of frames and wherein the first frame of each exhibition is the image of the character;

an input device which enables a player to select at least one of the images of said character;

a display device which displays the characters and the exhibitions; and a processor, in communication with the input device and the display device, which, after a player selects one of the images of the character, causes the exhibition associated with the selected image of the character to occur.

25. The gaming device of claim 24, wherein the characteristic is selected from the group consisting of color, size, shape and position.

26. A method of providing a player with an opportunity to play a gaming device, said method comprising the steps of:

(a) initiating a game;

(a) displaying a plurality of symbols including a plurality of identical first symbols;

(a) providing a different exhibition associated with each identical first symbol;

(a) enabling a player to select at least one of the identical first symbols; and (a) displaying the exhibition associated with the selected identical first symbol.

27. The method of claim 26, wherein the step of displaying a plurality of symbols including a plurality of identical first symbols includes the step of displaying a plurality of identical images of a predetermined character.

28. The method of claim 26, which includes the step of displaying a plurality of reels.

29. The method of claim 28, which includes the step of displaying the identical first symbols on the reels.

30. The method of claim 26, which includes the step of displaying the exhibitions on the reels.

31. A gaming device including a game comprising:

a plurality of symbols including a number greater than one of identical first symbols;

a number of different exhibitions at least equal to the number of identical first symbols, and where each said exhibition includes a plurality of images and said different exhibitions each include at least one different image;

an input device which enables a player to select at least one of the symbols;

at least one display device which displays the symbols and the exhibitions associated with the selected symbols; and a processor in communication with the input device and the display device, which causes the display device to display one of said exhibitions not previously displayed in the game when the player selects each of the identical first symbols.

32. A gaming device comprising:

a plurality of identical selectable symbols;

a different exhibition associated with each of the identical selectable symbols;

a display device; and a processor operable upon a wager by a player and which enables a selection of one of the identical selectable symbols to occur and causes the display device to display the exhibition associated with said symbol.

33. The gaming device of claim 32, wherein the symbols are characters.

34. The gaming device of claim 33, wherein the characters have a difference selected from the group consisting of difference in color, difference in expression, difference in position and difference in outfit.

35. The gaming device of claim 32, wherein at least one of the exhibitions includes an exhibition selected from the group consisting of at least a portion of a movie and at least a portion of a television program.

36. The gaming device of claim 32, which includes an input device controlled by the processor which enables a player to select at least one of the symbols.

* * * * *

UNITED STATES PATENT AND TRADEMARK OFFICE

CERTIFICATE OF CORRECTION

PATENT NO. : 6,554,703 B1
DATED : April 29, 2003
INVENTOR(S) : Bussick et al.

It is certified that error appears in the above-identified patent and that said Letters Patent is hereby corrected as shown below:

Title page,
Item [57], ABSTRACT,
Lines 1 and 2, change "The present invention is a gaming device that provides a gaming device that displays" to -- The present invention is a gaming device that displays --.

Column 2,
Line 34, change "FIG. 3 is flow" to -- FIG. 3 is a flow --.

Column 6,
Line 15, change "offer" to -- offers --.

Column 8,
Line 53, change "comprising;" to -- comprising: --.

Signed and Sealed this

Twenty-ninth Day of July, 2003

JAMES E. ROGAN
*Director of the United States Patent and Trademark Office*